(12) United States Patent
Hoshuyama

(10) Patent No.: US 7,777,800 B2
(45) Date of Patent: Aug. 17, 2010

(54) DIGITAL STILL CAMERA AND IMAGE PROCESSING SYSTEM

(75) Inventor: Hideo Hoshuyama, Kawasaki (JP)

(73) Assignee: Nikon Corporation, Tokyo (JP)

( * ) Notice: Subject to any disclaimer, the term of this patent is extended or adjusted under 35 U.S.C. 154(b) by 803 days.

(21) Appl. No.: 11/132,403

(22) Filed: May 19, 2005

(65) Prior Publication Data

US 2005/0259175 A1  Nov. 24, 2005

(30) Foreign Application Priority Data

May 21, 2004   (JP) ............................... 2004-151622

(51) Int. Cl.
   *H04N 5/232* (2006.01)
   *G03B 17/00* (2006.01)
(52) U.S. Cl. .................. 348/345; 348/349; 348/351; 348/356; 396/72
(58) Field of Classification Search ......... 348/345–349, 348/350, 351–354, 356, 355; 396/72, 73, 396/79, 80, 82, 90, 91
   See application file for complete search history.

(56) References Cited

U.S. PATENT DOCUMENTS

| 5,249,058 | A | | 9/1993 | Murata et al. | |
|---|---|---|---|---|---|
| 5,757,429 | A | * | 5/1998 | Haruki | 348/354 |
| 6,094,223 | A | * | 7/2000 | Kobayashi | 348/354 |
| 6,380,972 | B1 | * | 4/2002 | Suga et al. | 348/211.99 |
| 6,683,651 | B1 | * | 1/2004 | Motta et al. | 348/345 |
| 6,812,969 | B2 | * | 11/2004 | Ide et al. | 348/346 |
| 6,885,819 | B2 | * | 4/2005 | Shinohara | 396/127 |
| 7,071,969 | B1 | * | 7/2006 | Stimson, III | 348/207.11 |
| 7,280,149 | B2 | * | 10/2007 | Weintroub et al. | 348/349 |
| 7,365,780 | B1 | * | 4/2008 | Miyazaki | 348/231.6 |
| 7,561,789 | B2 | * | 7/2009 | Border et al. | 396/111 |
| 2002/0154909 | A1 | * | 10/2002 | Yamazaki et al. | 348/351 |
| 2003/0118245 | A1 | * | 6/2003 | Yaroslavsky et al. | 382/255 |
| 2003/0174230 | A1 | * | 9/2003 | Ide et al. | 348/345 |
| 2007/0216796 | A1 | * | 9/2007 | Lenel et al. | 348/345 |

FOREIGN PATENT DOCUMENTS

| JP | B2 2786894 | | 5/1998 |
|---|---|---|---|
| JP | A 2002-207162 | | 7/2002 |
| JP | 2004135029 A | * | 4/2004 |
| JP | A-2004-109358 | | 4/2004 |
| JP | A-2004-135029 | | 4/2004 |

* cited by examiner

*Primary Examiner*—Tuan Ho
*Assistant Examiner*—Marly Camargo
(74) *Attorney, Agent, or Firm*—Oliff & Berridge, PLC

(57) ABSTRACT

A digital still camera includes an image-capturing unit capturing a subject image via an image-capturing lens to create an image, a focus detecting unit detecting focus in accordance with the image created by the image-capturing unit, an image-capturing lens driving unit driving the image-capturing lens in accordance with a result of the focus detection provided by the focus detecting unit, and a receiving unit receiving an instruction to initiate image capture by the image-capturing unit. When the receiving unit receives the instruction to initiate image capture, the image-capturing unit captures the subject image successively to create a plurality of images, while the image-capturing lens driving unit drives the image-capturing lens successively. Accordingly, it is possible to provide an image in a high in-focus state while shortening the time required until an image is actually captured after an instruction is provided to initiate the capture of the image.

8 Claims, 4 Drawing Sheets

DIGITAL STILL CAMERA AND IMAGE PROCESSING SYSTEM

CROSS-REFERENCE TO RELATED APPLICATIONS

This application is based upon and claims the benefit of priority from Japanese Patent Application No. 2004-151622, filed on May 21, 2004, the entire contents of which are incorporated herein by reference.

BACKGROUND OF THE INVENTION

1. Field of the Invention

The present invention relates to a digital still camera having an automatic focusing function and to an image processing system which includes the digital still camera and an image processing device.

2. Description of the Related Art

Digital still cameras which have an automatic focusing function are conventionally known. In such a digital still camera, every time the image-capturing lens is driven to capture an image, its focus is detected in accordance with the contrast of the image captured. After the focus detection is completed, the image-capturing lens is driven again to capture an image and detect its focus. To this end, generally employed is a mount-climbing scheme, in which the aforementioned sequence of driving the image-capturing lens to capture an image and detect its focus is repeated until proper focus is achieved (e.g., see Japanese Patent Gazette No. 2786894). Automatic focusing according to such a mount-climbing scheme is successively performed until an image is actually captured after an instruction is provided to initiate the capture of the image.

However, in the automatic focusing according to the aforementioned mount-climbing scheme, the sequence of driving the image-capturing lens to capture an image and then detect its focus is repeated until proper focus is achieved. Thus, a long time is required until an image is actually captured after an instruction is provided to initiate the capture of the image. Additionally, in the automatic focusing according to the mount-climbing scheme, the proper focus position of the image-capturing lens can be known for the first time only after the lens has passed by the proper focus position. Therefore, to capture an image with the image-capturing lens at the proper focus position, the image-capturing lens must be driven back in the opposite direction. Accordingly, the chance to capture the desired image would be missed in some cases.

SUMMARY OF THE INVENTION

It is therefore an object of the present invention to provide a digital still camera which can provide an image in a high in-focus state while shortening the time required until an image is actually captured after an instruction is provided to initiate the capture of the image. It is another object of the invention to provide an image processing system which includes the digital still camera and an image processing device.

To accomplish the aforementioned objects, a digital still camera according to the present invention includes: an image-capturing unit capturing a subject image via an image-capturing lens to create an image; a focus detecting unit detecting focus in accordance with the image created by the image-capturing unit; an image-capturing lens driving unit driving the image-capturing lens in accordance with a result of the focus detection provided by the focus detecting unit; and a receiving unit receiving an instruction to initiate image capture. The digital still camera is adapted such that when the receiving unit receives an instruction to initiate image capture, the image-capturing unit captures the subject image successively to create a plurality of images, while the image-capturing lens driving unit drives the image-capturing lens successively.

Preferably, when the receiving unit receives the instruction to initiate image capture, the focus detecting unit carries out the focus detection in accordance with the plurality of images successively captured and created by the image-capturing unit. When the focus detecting unit detects a proper focus position of the image-capturing lens, the image-capturing capturing unit stops successive capturing of images, while the image-capturing lens driving unit stops successive driving of the image-capturing lens.

Furthermore, the focus detecting unit preferably carries out the focus detection intermittently in accordance with part of the plurality of images successively captured and created by the image-capturing unit.

Still furthermore, the digital still camera preferably further includes a selecting unit selecting the image in the highest in-focus state from the plurality of images successively captured and created by the image-capturing unit.

Furthermore, the digital still camera preferably further includes a temporary recording unit temporarily recording the plurality of images successively captured and created by the image-capturing unit, a selecting unit selecting the image in the highest in-focus focus state from the plurality of images recorded in the temporary recording unit, and a recording unit recording the image selected by the selecting unit.

On the other hand, to accomplish the aforementioned objects, an image processing system according to the present invention incorporates a digital still camera and an image processing device. The digital still camera includes: an image-capturing unit capturing a subject image via an image-capturing lens to create an image; a focus detecting unit detecting focus in accordance with the image created by the image-capturing unit; an image-capturing lens driving unit driving the image-capturing lens in accordance with a result of the focus detection provided by the focus detecting unit; and a receiving unit receiving an instruction to initiate image capture. The image processing system is adapted such that when the receiving unit receives an instruction to initiate image capture, the image-capturing unit captures the subject image successively to create a plurality of images, while the image-capturing lens driving unit drives the image-capturing lens successively. The image processing device includes a selecting unit selecting the image in the highest in-focus state from the plurality of images successively captured and created by the image-capturing unit.

BRIEF DESCRIPTION OF THE DRAWINGS

The nature, principle, and utility of the invention will become more apparent from the following detailed description when read in conjunction with the accompanying drawings in which like parts are designated by identical reference numbers, in which.

DESCRIPTION OF THE PREFERRED EMBODIMENTS

Now, best modes for carrying out the present invention will be described below with reference to the accompanying drawings.

First Embodiment

Figure 1:
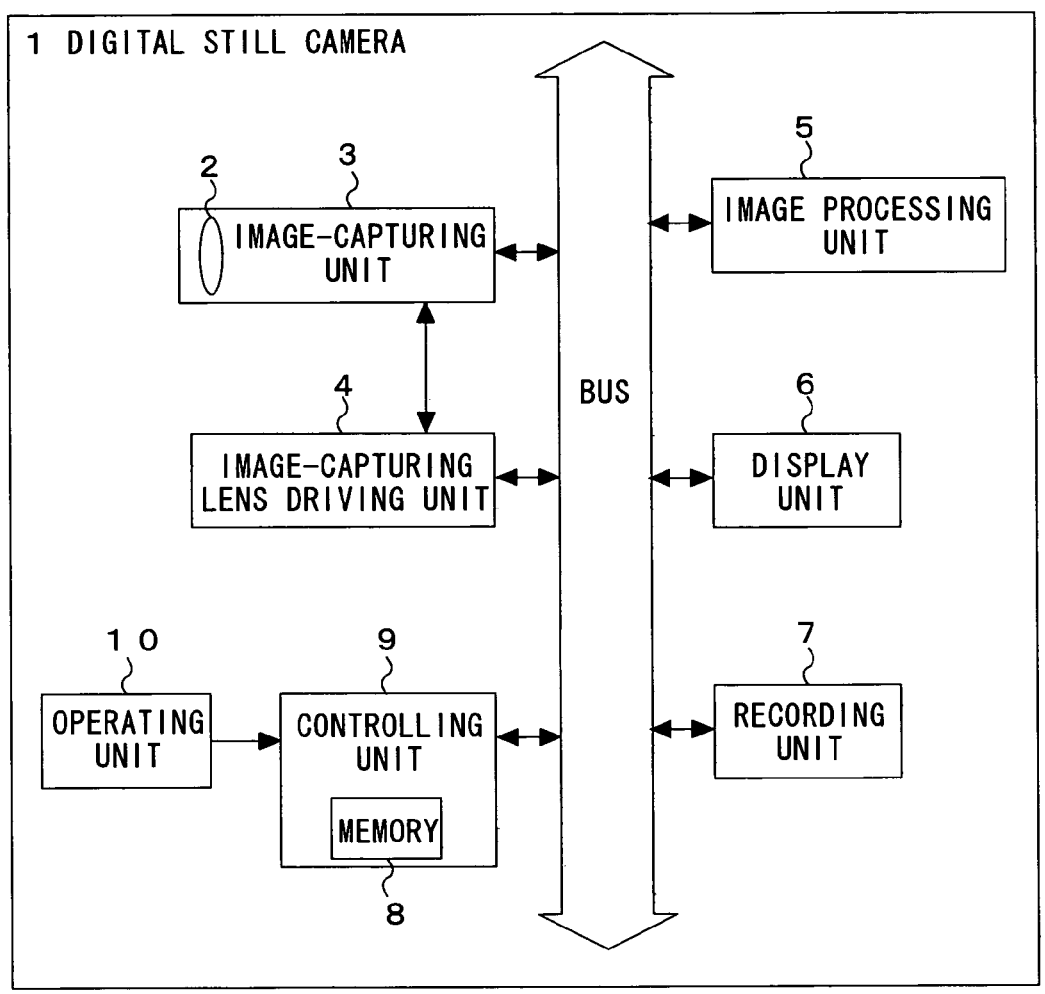
FIG. 1 is a block diagram showing the configuration of a digital still camera 1 according to a first embodiment.

As shown in FIG. 1, a digital still camera 1 according to a first embodiment includes an image-capturing unit 3 with an image-capturing lens 2, an image-capturing lens driving unit 4 for driving the image-capturing lens 2, an image processing unit 5, a display unit 6, a recording unit 7, and a controlling unit 9 having a memory 8 incorporated therein, in which all the units are interconnected via a bus. The digital still camera 1 further includes an operating unit 10 which has a power button, a release button (not shown) and the like. The state of the operating unit 10 is sensed by the controlling unit 9.

In addition to the aforementioned image-capturing lens 2, the image-capturing unit 3 includes a variety of sensors for measuring the brightness of a subject, its shooting distance and the like, and a photoelectric conversion element such as a CCD image sensor. The image-capturing unit 3 further includes an analog gain adjusting unit for amplifying an image obtained by the photoelectric conversion element, and an A/D converter for analog to digital conversion of signals. The image-capturing unit 3 allows the photoelectric conversion element to capture a subject image via the image-capturing lens 2, and then creates an image via the analog gain adjusting portion and the A/D converter.

The image-capturing lens driving unit 4 drives the image-capturing lens 2 in the direction of the optical axis of the image-capturing lens 2. The amount and direction of driving the image-capturing lens 2 are determined by the controlling unit 9.

The image processing unit 5 performs predetermined image processing such as white balance control on an image created by the image-capturing unit 3.

The display unit 6 includes a display processing unit and a liquid crystal monitor (not shown). The liquid crystal monitor is used not only for playback display of an image captured by the image-capturing unit 3 but also as a viewfinder for composing images.

The recording unit 7 includes an interface unit (not shown), into which a memory card (a card-shaped removable memory) is detachably inserted to record images therein which are created by the image-capturing unit 3.

The controlling unit 9 pre-records a program for performing each operation of the digital still camera 1. Using this program, the controlling unit 9 provides control to each of the image-capturing unit 3, the image-capturing lens driving unit 4, the image processing unit 5, the display unit 6, and the recording unit 7.

When the user turns on the power button (not shown), the digital still camera 1 configured as described above performs an initial operation to activate each unit in order to start capturing and displaying images or thru-images for composing a picture. The image-capturing unit 3 repeats capture of thru-images at predetermined time intervals. Every time a thru-image is captured and created by the image-capturing unit 3, the display unit 6 displays the thru-image. The thru-image captured at this time is used to compose a picture, and thus coarser than one that is actually captured and created (hereinafter referred to as "final image capture").

Figure 2:
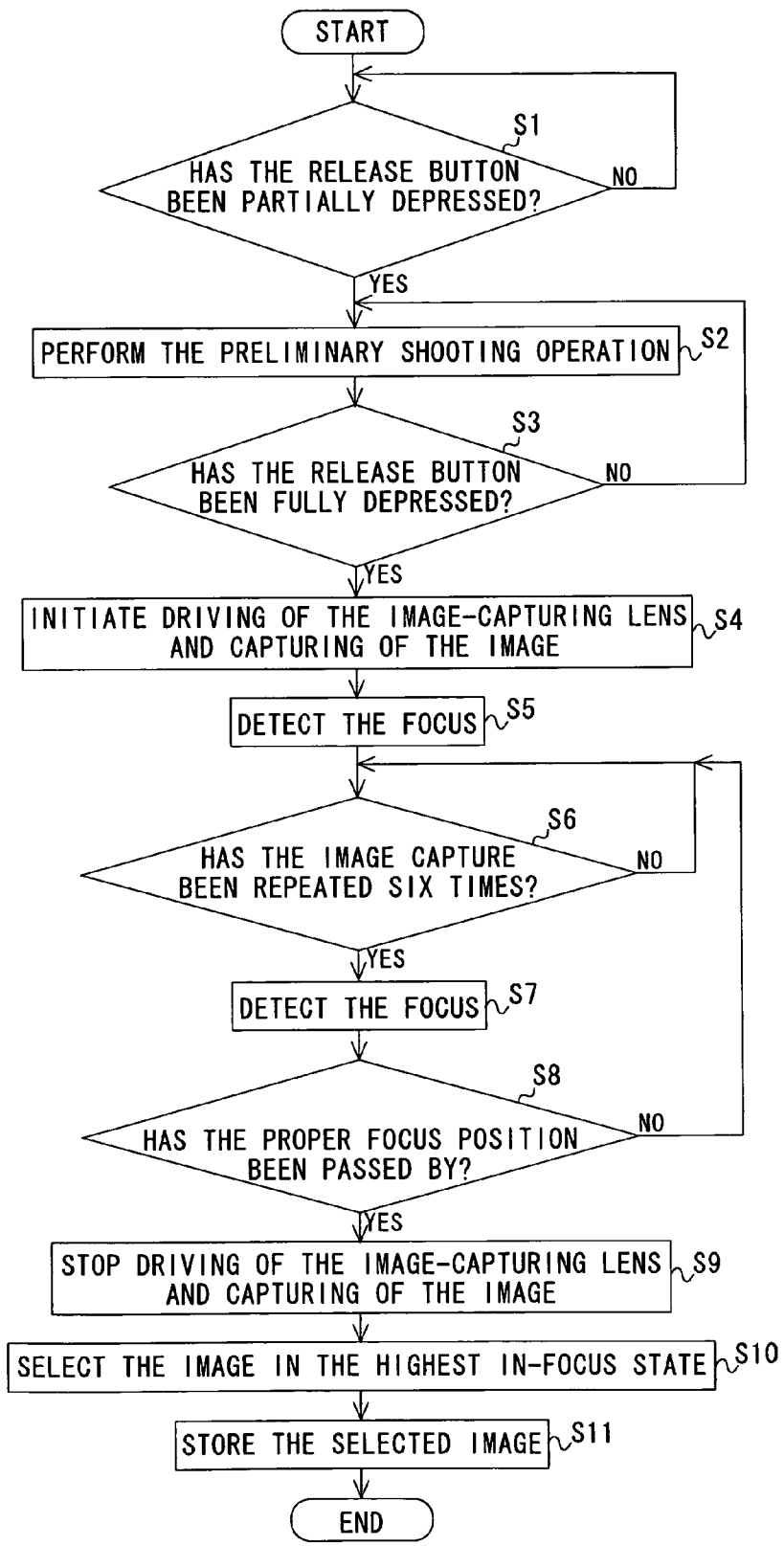
FIG. 2 is a flowchart showing the operation of the digital still camera 1 according to the first embodiment.
Figure 3:
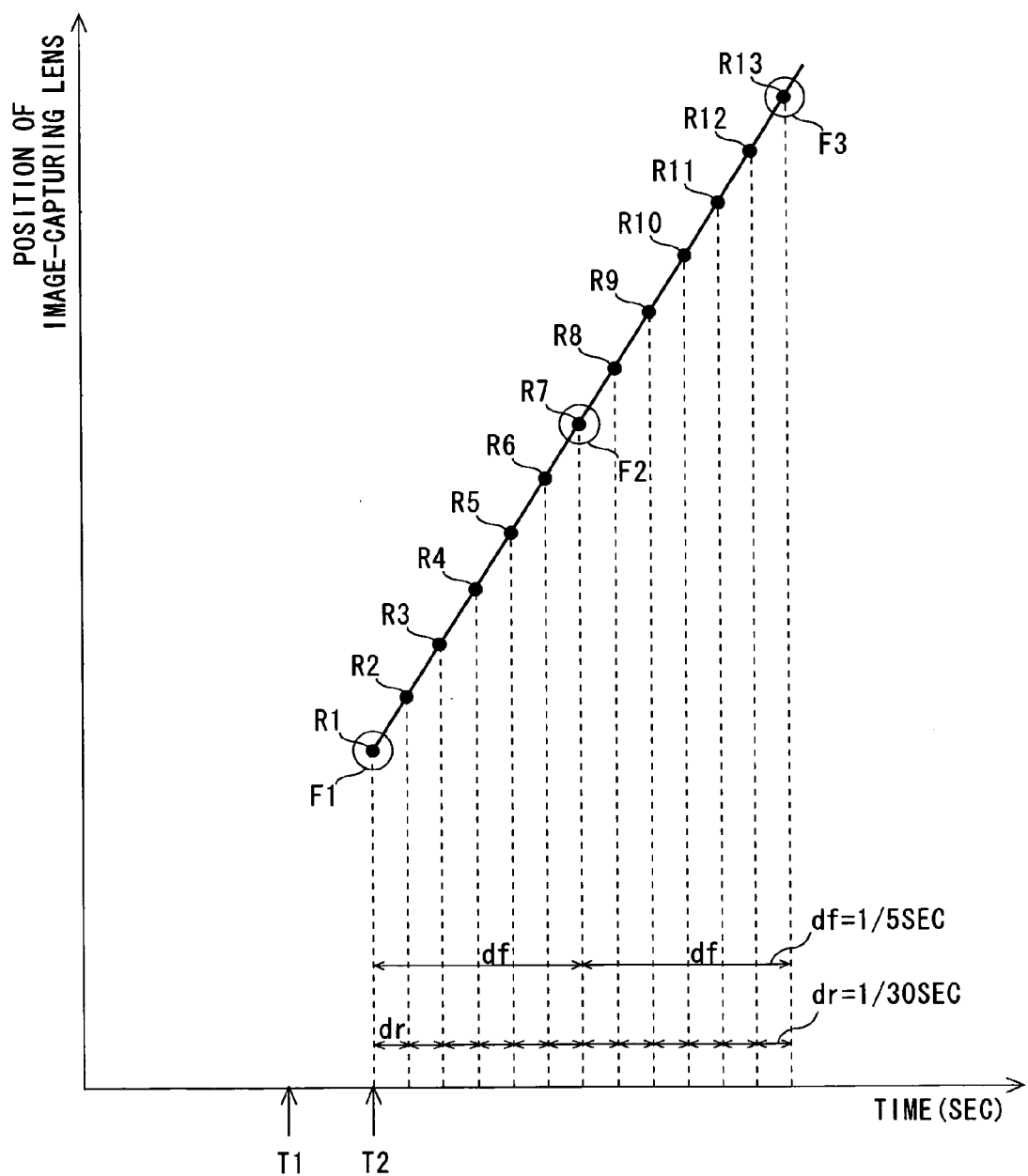
FIG. 3 is an explanatory view showing the timing of each operation of the digital still camera 1.

Now, referring to the flowchart of FIG. 2 and FIG. 3, a detailed description is given as to how the digital still camera 1 operates at the time of final image capture. The graph in FIG. 3 shows the timing of each operation of the digital still camera 1. In the graph of FIG. 3, the horizontal axis represents the elapse of time and the vertical axis represents the position of the image-capturing lens 2.

First, the controlling unit 9 determines whether the release button is partially depressed (Step S1). The controlling unit 9 repeats the determination until the release button is partially depressed (until "YES" is encountered in Step S1). If the release button is partially depressed, the controlling unit 9 performs a preliminary image capture operation (Step S2).

More specifically, the preliminary image capture operation refers to a coarse automatic focusing operation using the aforementioned thru-image. During the coarse automatic focusing operation, the controlling unit 9 detects the contrast of a thru-image created by the image-capturing unit 3, allowing the image-capturing lens driving unit 4 to drive the image-capturing lens 2 in such a direction in which the contrast increases. At this time, the controlling unit 9 allows the automatic focusing operation to be performed at a position slightly shifted backward from where proper focus is achieved. As such, the coarse automatic focusing operation is performed at a position slightly shifted backward from where proper focus is achieved. This is done to always clearly define the direction of successive driving of the image-capturing lens 2, which will be discussed later. The controlling unit 9 repeatedly performs such a coarse automatic focusing operation until the user fully depresses the release button, which will be detailed later.

Then, the controlling unit 9 determines whether the release button is fully depressed (Step S3). The controlling unit 9 repeats the aforementioned coarse automatic focusing operation until the release button is fully depressed (until "YES" is encountered in Step S3). When the release button is fully depressed, the controlling unit 9 terminates the coarse automatic focusing operation and then starts successively driving the image-capturing lens 2 and capturing a subject image via the image-capturing lens 2 (Step S4).

The controlling unit 9 recognizes the direction of driving the image-capturing lens 2 in accordance with the result of a coarse focusing operation performed immediately before the release button is fully depressed. Then, the image-capturing lens driving unit 4 successively drives the image-capturing lens 2 at a predetermined speed in the direction of drive recognized. Now, an example is shown below in which the image-capturing lens 2 is driven away from the camera body. In this case, when the release button is fully depressed at time T1 in FIG. 3 (i.e., when "YES" is encountered in Step S3), the image-capturing lens driving unit 4 successively drives the image-capturing lens 2 at a predetermined speed from time T2 as shown in FIG. 3. The difference between times T1 and T2 is the time lag between when the release button is fully depressed and when the image-capturing lens 2 is driven.

Generally at the same time as the driving of the image-capturing lens 2 is initiated as described above, the controlling unit 9 starts capturing a subject image via the image-capturing lens 2. The controlling unit 9 allows the image-capturing unit 3 to successively capture the subject image at predetermined time intervals dr (e.g., 30 frames per second). That is, the digital still camera 1 captures the subject image successively while successively driving the image-capturing lens 2. During this operation, a more detailed image than the thru-images is created as an image for final image capture by the image-capturing unit 3. Points R1 to R13 in FIG. 3 show the timing of subject image capture. When the release button is fully depressed at time T1 in FIG. 3 (i.e., when "YES" is encountered in Step S3), the image-capturing unit 3 starts at time T2 successively capturing a subject image at predetermined time intervals dr (1/30 seconds), as shown in FIG. 3. As described above, the difference between time T1 and T2 is the time lag between when the release button is fully depressed and when image capture is initiated. The controlling unit 9 allows a plurality of images captured and created successively to be temporarily stored in the memory 8 within the controlling unit 9.

Immediately after an image is created through the first image capture (i.e., the image capture at R1 in FIG. 3), the controlling unit 9 determines the contrast of the image created to detect the focus of the image when captured (Step S5). Then, the controlling unit 9 sets a counter (not shown) to zero which is provided within the controlling unit 9 to keep count of image captures repeated by the image-capturing unit 3. Thereafter, the process proceeds to Step S6.

Then, the controlling unit 9 determines whether the image capture has been repeated six times (Step S6). Until the count of image captures kept by the counter (not shown) within the controlling unit 9 reaches six times (i.e., until "YES" is encountered in Step S6), the controlling unit 9 captures the subject image successively (see Step S4) while successively driving the image-capturing lens 2, and stores a plurality of images thus created in the memory 8 within the controlling unit 9. When the count of image captures reaches six times, the controlling unit 9 resets the counter (not shown) within the controlling unit 9 to zero, then allowing the process to proceed to Step S7.

Then, the controlling unit 9 determines the contrast of an image created through the immediately preceding image capture to detect the focus of the image when captured (Step S7). The hollow circles F1 to F3 in FIG. 3 show the timing of focus detection. As shown in FIG. 3, every time an image is captured six times, the controlling unit 9 detects the focus of the image. As mentioned above, since the image-capturing unit 3 captures the subject image at time intervals dr (1/30 seconds), the controlling unit 9 detects the focus at time intervals dr of 1/5 seconds. That is, the controlling unit 9 is to intermittently detect the focus every time the image capture is repeated six times.

Then, the controlling unit 9 compares the result of the current focus detection with that of the previous focus detection, thereby determining whether the proper focus position has been passed by (Step S8). If the current focus detection provides a better result than the previous focus detection (i.e., a higher contrast), the controlling unit 9 determines that the proper focus position has not yet been passed by (i.e., that the image-capturing lens 2 has to be further driven). The controlling unit 9 thus continues to successively capture the subject image while successively driving the image-capturing lens 2, and then stores the plurality of images thus created in the memory 8 within the controlling unit 9.

On the other hand, if the current focus detection provides a worse result than the previous focus detection (i.e., a lower contrast), the controlling unit 9 determines that the proper focus position has been passed by. The controlling unit 9 then stops the successive driving of the image-capturing lens 2 via the image-capturing lens driving unit 4 and the successive capturing of the subject image by the image-capturing unit 3 (Step S9). Now, a description will be given below assuming that the process determines based on the focus detection at timing F3 in FIG. 3 that the proper focus position has been passed by.

In this case, the controlling unit 9 then selects the image in the highest in-focus state out of the plurality of images captured and created successively by the image-capturing unit 3 (Step S10). First, the controlling unit 9 reads several images, i.e., the image (captured and created at R13 in FIG. 3) subjected to the last focus detection (i.e., the focus detection at F3 in FIG. 3), the image (captured and created at R7 in FIG. 3) subjected to the second last focus detection (i.e., the focus detection at F2 in FIG. 3), and a plurality of the images captured between the aforementioned images (i.e., the images captured and created at R8 to R12 in FIG. 3) from the plurality of images temporarily recorded in the memory 8 within the controlling unit 9. The controlling unit 9 then selects the image in the highest in-focus state of those that have been read out.

More specifically, the controlling unit 9 determines the contrast of each of the plurality of images that have been read out (i.e., the images captured and created at R7 to R13 in FIG. 3), and then selects the highest contrast image as the image in the highest in-focus state. For example, in FIG. 3, the image captured and created at point R9 is selected.

In the foregoing, contrasts have already been determined for the image (captured and created at R13 in FIG. 3) subjected to the last focus detection (i.e., the focus detection at F3 in FIG. 3) and the image (captured and created at R7 in FIG. 3) subjected to the second last focus detection (i.e., the focus detection at F2 in FIG. 3). However, to select the image in the highest in-focus state, the controlling unit 9 detects contrast again with higher accuracy.

If the two images have the same contrast, the one obtained before proper focus is achieved may be selected. Furthermore, since an image between the two images selected is considered to be the image in the highest in-focus state, the selected image may also be subjected to a slight edge enhancement. Then, the controlling unit 9 records the selected image in the recording unit 7 (Step S11) and clears the other images from the memory 8, then terminating the series of processing.

As described above, according to the first embodiment, when an instruction to initiate image capture is received (which corresponds to a full depression of the release button), the image-capturing lens 2 is successively driven while the subject image is being successively captured to create a plurality of images. Accordingly, it is possible to create a plurality of differently focused images including one that is in focus. This can be done without an automatic focusing operation according to the conventional mount-climbing scheme in which the sequence of driving the image-capturing lens 2 to capture an image and then detect its focus is repeated until proper focus is achieved. Accordingly, it is possible to provide an image in a high in-focus state while shortening the time required until an image is actually captured after an instruction is provided to initiate the capture of the image.

Furthermore, according to the first embodiment, focus detections are performed in accordance with a plurality of images captured and created successively by the image-capturing unit 3. Upon detection of the image-capturing lens 2 being in focus (or having passed by the proper focus position), the successive capturing of images by the image-capturing unit 3 and the successive driving of the image-capturing lens 2 are stopped. For this reason, at the time the image-capturing lens 2 being in focus is detected, the capturing of images can be immediately interrupted. Accordingly, it is possible to avoid capturing and creating unnecessary images to be stored.

Furthermore, according to the first embodiment, the focus detection is carried out intermittently in accordance with part of a plurality of images captured and created successively by the image-capturing unit 3. For this reason, it is possible to drive the image-capturing lens 2 at an increased speed as compared to the conventional automatic focusing operation according to the mount-climbing scheme. Accordingly, it is possible to significantly reduce the time required until an image is actually captured after an instruction to initiate the capture of the image is provided.

Furthermore, according to the first embodiment, the image in the highest in-focus state is selected from a plurality of images captured and created successively by the image-capturing unit 3. In other words, the same operation as the conventional automatic focusing operation according to the mount-climbing scheme can be performed after image capture. Accordingly, it is possible to provide an image in a high in-focus state while shortening the time required until an image is actually captured after an instruction is provided to initiate the capture of the image.

Furthermore, according to the first embodiment, a plurality of images captured and created successively by the image-capturing unit 3 are temporarily recorded. Then, from the plurality of images recorded in the temporary recording unit, the image in the highest in-focus state is selected and then the selected image is recorded. For this reason, it is possible to obtain an image in a high in-focus state without wasting the capacity of the memory 8.

Second Embodiment

Now, the present invention will be described with reference to the drawings in accordance with a second embodiment. The second embodiment provides an image processing system which includes a digital still camera and an image processing device.

Figure 4:
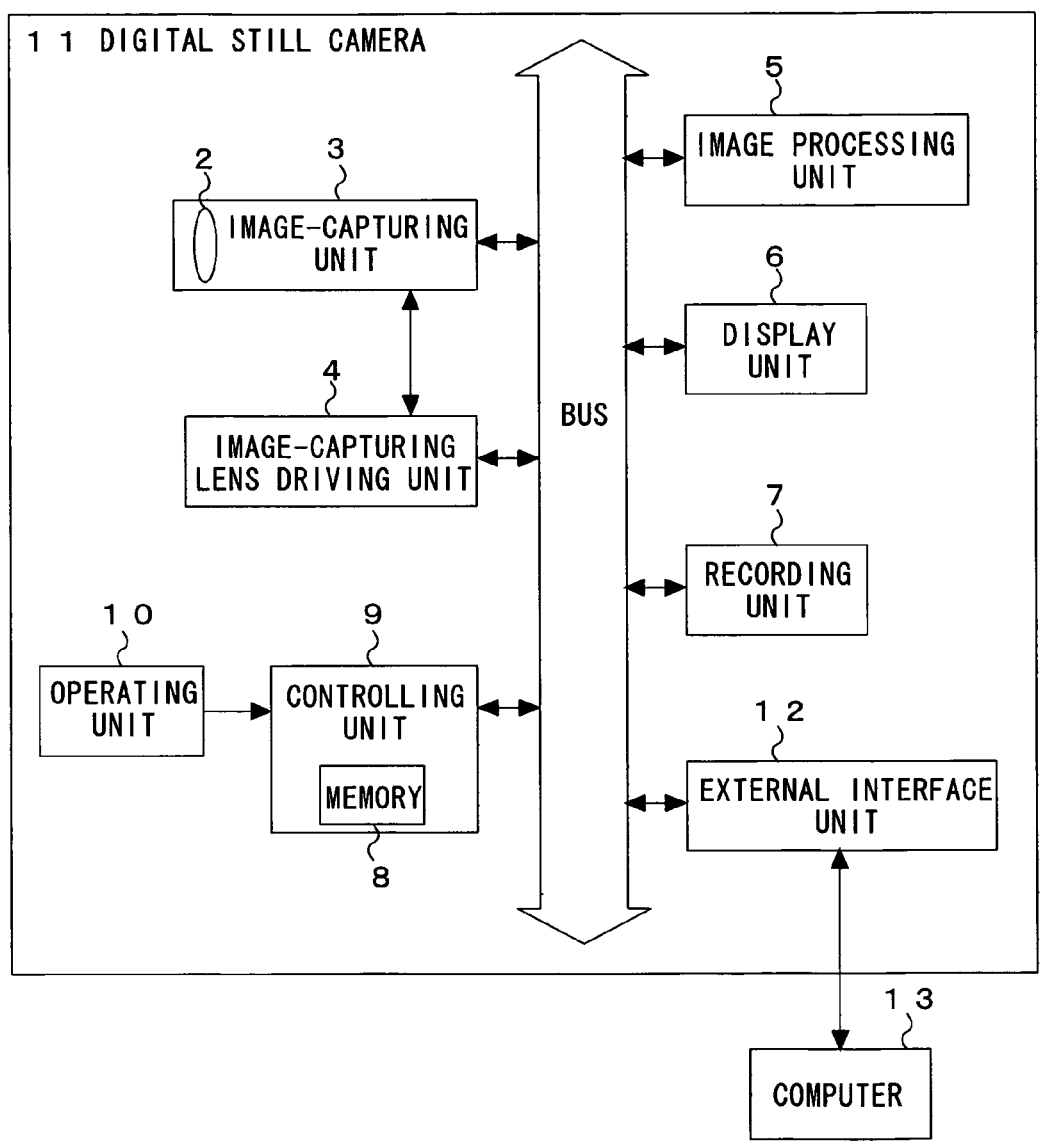
FIG. 4 is a block diagram showing the configuration of an image processing system 100 according to a second embodiment.

FIG. 4 shows an image processing system 100 according to the second embodiment, which includes a computer 13 and a digital still camera 11 that is generally the same as the digital still camera 1 of the first embodiment. In the following description, the same symbols as those for the digital still camera 1 of the first embodiment will be used to explain the digital still camera 11.

As shown in FIG. 4, the digital still camera 11 includes an external interface unit 12 in addition to the same units as those of the digital still camera 1 of the first embodiment. The external interface unit 12 is a driver (e.g., a SCSI interface) for connecting the digital still camera 11 to the external computer 13. The digital still camera 11 and the computer 13 are detachably connected to each other via the external interface unit 12.

A controlling unit (not shown) of the computer 13 pre-records a program for performing the operation according to the second embodiment.

In the image processing system 100 configured as described above, the digital still camera 11 captures a subject image by following the same procedures as those in Steps S1 to S9 of FIG. 2 described in relation to the first embodiment. However, unlike the digital still camera 1 of the first embodiment, every time an image is captured and created successively, the digital still camera 11 records the image not in the memory 8 within the controlling unit 9 but in the recording unit 7. That is, the digital still camera 11 records a plurality of images captured and created not temporarily but entirely in the recording unit 7. At this time, the digital still camera 11 records each image so as to be recognized as successively captured images (e.g., using tag information).

The aforementioned image capture is typically performed by the digital still camera 11 that is not connected to the computer 13, and the digital still camera 11 and the computer 13 are connected to each other after the image capture.

The controlling unit (not shown) in the computer 13 acquires the plurality of images, which have been captured and created successively, from the recording unit 7 of the digital still camera 11 via the external interface unit 12. Then, the controlling unit (not shown) in the computer 13 selects and records an image by following the same procedures as those in Steps S10 and S11 of FIG. 2 described in relation to the first embodiment.

As described above, according to the second embodiment, upon reception of an instruction to initiate image capture, the digital still camera 11 successively drives the image-capturing lens 2 while successively capturing a subject image to create a plurality of images. The computer 13 selects the image in the highest in-focus state from the plurality of images captured and created successively by the image-capturing unit 3 of the digital still camera 11. For this reason, it is possible for the digital still camera 11 to create a plurality of differently focused images including one that is in focus. This can be done without a conventional automatic focusing operation according to the mount-climbing scheme in which the sequence of driving the image-capturing lens 2 to capture an image and then detect its focus is repeated until proper focus is achieved. Thus, the image processing system according to the second embodiment makes it possible to provide an image in a high in-focus state while shortening the time required until an image is actually captured after an instruction is provided to initiate the capture of the image.

In the first and second embodiments, such an example has been shown in which the contrast of an image is detected at the time of focus detection during successive captures of a subject image (see Steps S5 and S7 in FIG. 2). However, the edge of an image may also be detected to determine its sharpness, thereby detecting its focus. Alternatively, the detections of contrast and edge may also be combined, or a method of focus detection can be set by the user.

According to the first and second embodiments, such an example has been shown in which the contrast of an image is detected at the time of selecting the image in the highest in-focus state (see Step S10 in FIG. 2). However, the edge of an image may also be detected to determine its sharpness, thereby detecting its focus. Alternatively, the detections of contrast and edge may also be combined, or other conditions (such as camera shake) may be taken into accounts. Furthermore, criteria for selection or the priority of conditions can be set by the user.

On the other hand, according to the first and second embodiments, such an example has been shown in which during successive captures of a subject image, the focus detection is carried out intermittently every time the image capture is repeated six times. However, how intermittently the focus detection is carried out is not limited to this example. For example, the frequency of the focus detection can be appropriately determined depending on the time interval of successive captures of the subject image or the processing capability of the controlling unit 9. Furthermore, how intermittently the focus detection is carried out can also be set by the user.

Furthermore, according to the first and second embodiments, such an example has been shown in which the image-capturing unit 3 successively captures images using a so-called continuous image capturing technique. However, a motion image technique can also be employed for image capture. Using the motion image technique to capture images allows for further increasing the driving speed of the image-capturing lens 2. This makes it possible to significantly reduce the time required until an image is actually captured after an instruction to initiate the capture of the image is provided.

Furthermore, the digital still camera 1 of the first embodiment and the digital still camera 11 of the second embodiment may be a single-lens reflex type digital still camera.

On the other hand, to successively capture a subject image, the user may depress the release button not partially but fully (i.e., the button is fully depressed at a time). In this case, conventionally, the automatic focusing operation according to the mount-climbing scheme was performed after the button was fully depressed at a time to initiate capture of images. Thus, a long time was required until an image was actually captured after an instruction was provided to initiate the capture of the image (corresponding to the release button being fully depressed at a time), thereby causing the chance of capturing the desired image to be missed in some cases.

On the other hand, according to the first and second embodiments, when the user fully depresses the release button at a time, the image-capturing lens 2 is successively driven while quickly capturing the subject image in succession to create a plurality of images. Accordingly, it is possible to provide an image in a high in-focus state while shortening the time required until an image is actually captured after an instruction is provided to initiate the capture of the image (corresponding to the release button being fully depressed at a time).

The invention is not limited to the above embodiments and various modifications may be made without departing from the spirit and scope of the invention. Any improvement may be made in part or all of the components.

What is claimed is:

1. A digital still camera comprising:
    an image-capturing unit capturing a subject image via an image-capturing lens and creating an image;
    a focus detecting unit detecting focus in accordance with said image created by said image-capturing unit;
    an image-capturing lens driving unit driving said image-capturing lens;
    a receiving unit receiving an instruction to capture and record an image;
    a controlling unit controlling said image-capturing lens driving unit to drive said image-capturing lens in a predetermined direction successively and driving said image-capturing lens to a plurality of different lens positions, controlling said image-capturing unit to capture a plurality of said subject images having different lens positions and creating a plurality of candidate images to be finally recorded, and controlling said focus detecting unit to detect focus in accordance with said candidate images, when said receiving unit receives said instruction;
    a judging unit judging whether a candidate image in the highest in-focus state is obtained or not in accordance with a result of the focus detection based on said candidate images; and
    a comparing unit comparing focus conditions of said candidate images when said judging unit judges that said candidate image in the highest in-focus state is obtained.

2. The digital still camera according to claim 1, wherein:
    when said judging unit judges that said candidate image in the highest in-focus state is obtained, said controlling unit controls said image-capturing unit to stop further capturing of said subject images and creating said candidate images and controls said image-capturing lens driving unit to stop successive driving of said image-capturing lens.

3. The digital still camera according to claim 2, wherein said focus detecting unit carries out the focus detection intermittently in accordance with part of said candidate images.

4. The digital still camera according to claim 1, further comprising a selecting unit selecting one of said candidate images in the highest in-focus state from said candidate images created by said image-capturing unit in accordance with a result of detection based on said candidate images.

5. The digital still camera according to claim 4, wherein when there are a plurality of candidate images in the highest in-focus state, said selecting unit selects a candidate image obtained before proper focus is achieved as said image in the highest in-focus state among said plurality of candidate images in the highest in-focus state.

6. The digital still camera according to claim 5, further comprising an image-processing unit performing edge enhancement on said candidate image obtained before proper focus is achieved and selected by said selecting unit.

7. The digital still camera according to claim 1, further comprising:
    a temporary recording unit temporarily recording said plurality of candidate images created by said image-capturing unit;
    a selecting unit selecting one of said candidate images in the highest in-focus state from said plurality of candidate images recorded in said temporary recording unit; and
    a recording unit recording said candidate image selected by said selecting unit.

8. An image processing system comprising a digital still camera and an image processing device, the digital still camera including:
    an image-capturing unit capturing a subject image via an image-capturing lens to create an image;
    a focus detecting unit detecting focus in accordance with said image created by said image-capturing unit;
    an image-capturing lens driving unit driving said image-capturing lens;
    a receiving unit receiving an instruction to capture and record an image; and
    a controlling unit controlling each of the image-capturing, focus detecting, image-capturing lens driving, and receiving units, wherein
    when said receiving unit receives said instruction, said control unit controls said image-capturing lens driving unit to drive said image-capturing lens in a predetermined direction successively and drive said image-capturing lens to a plurality of different lens positions, controls said image-capturing unit to capture a plurality of said subject images having different lens positions and create a plurality of candidate images to be finally recorded, controls said focus detecting unit to detect focus in accordance with said candidate images, and determines whether a candidate image in the highest in-focus state is obtained or not in accordance with a result of the focus detection based on said candidate images, and
    said image processing device includes a comparing unit comparing focus conditions of said candidate images when said controlling unit determines that said candidate image in the highest in-focus state is obtained and a selecting unit selecting the candidate image in the highest in-focus state from said candidate images created by said image-capturing unit in accordance with a result of the focus detection based on said candidate images.

* * * * *